S. B. DUNN.
MOUTH SPECULUM.
APPLICATION FILED AUG. 2, 1909.
1,022,068.
Patented Apr. 2, 1912.
2 SHEETS—SHEET 1.
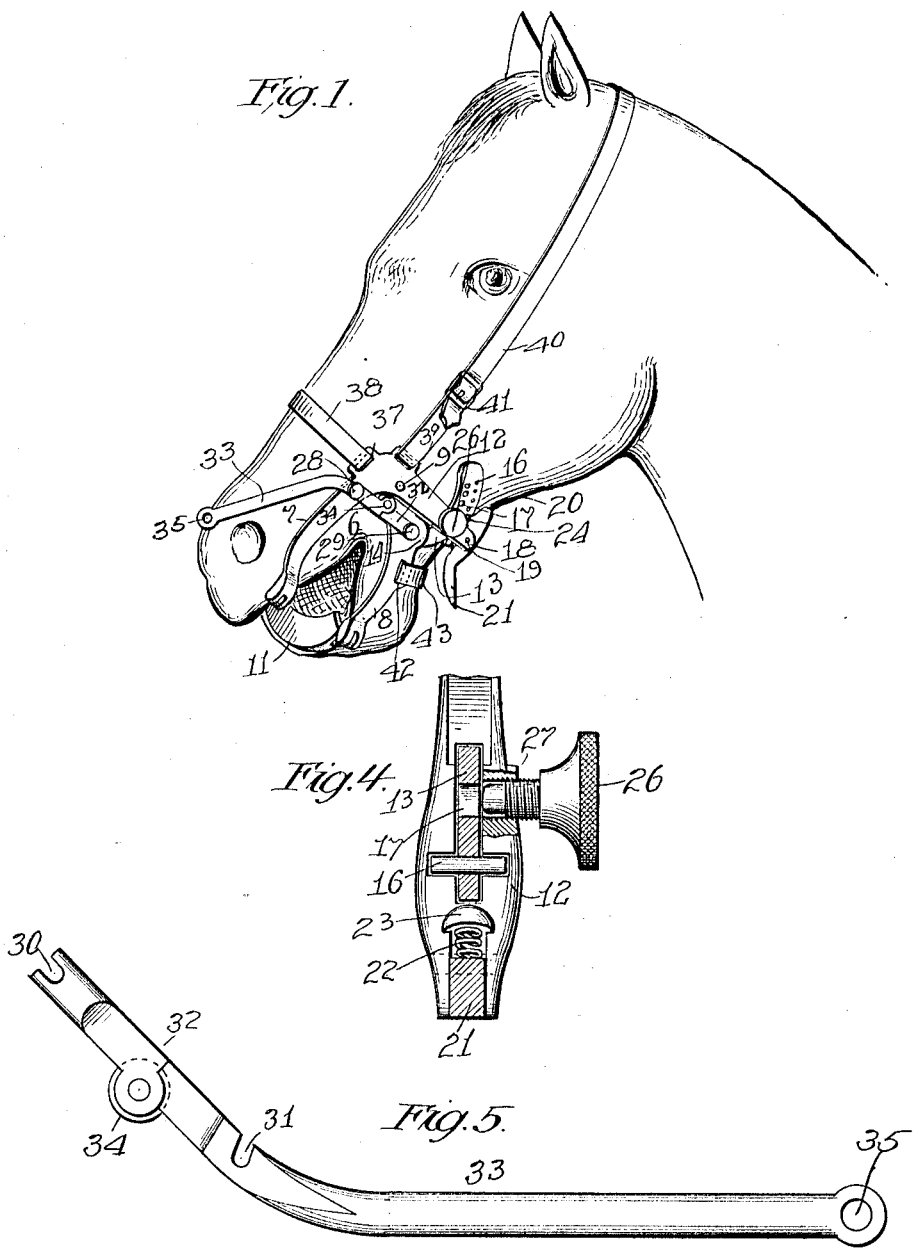
Witnesses
H. R. L. White
R. A. White
Inventor
Sola B. Dunn
By Jno. G. Elliott Atty.
COLUMBIA PLANOGRAPH CO., WASHINGTON, D. C.

S. B. DUNN.
MOUTH SPECULUM.
APPLICATION FILED AUG. 2, 1909.
1,022,068.
Patented Apr. 2, 1912.
2 SHEETS—SHEET 2.
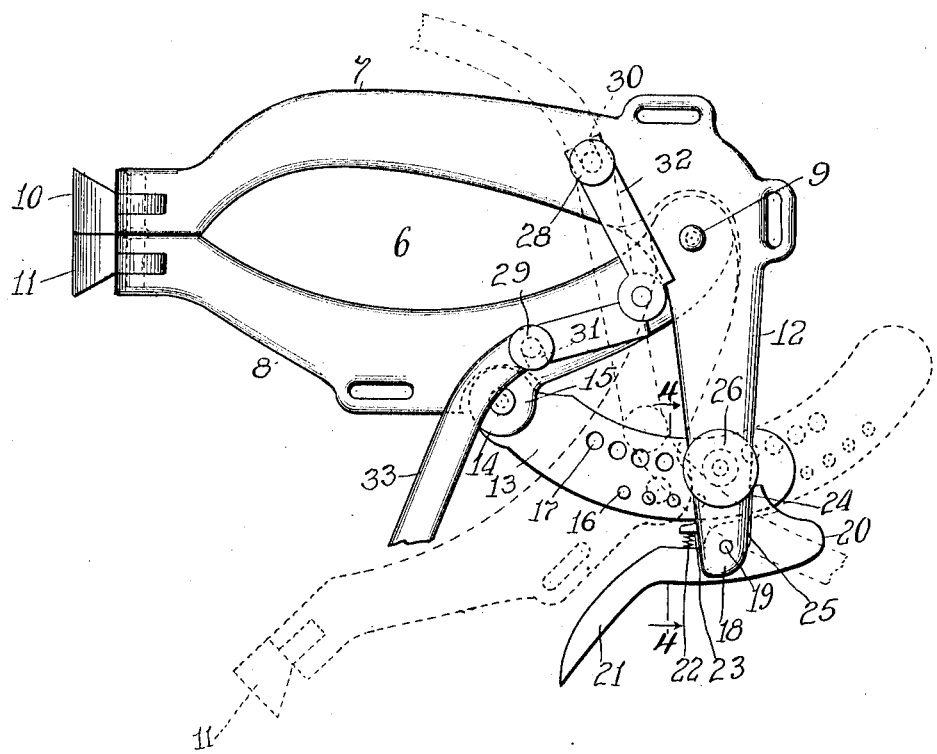
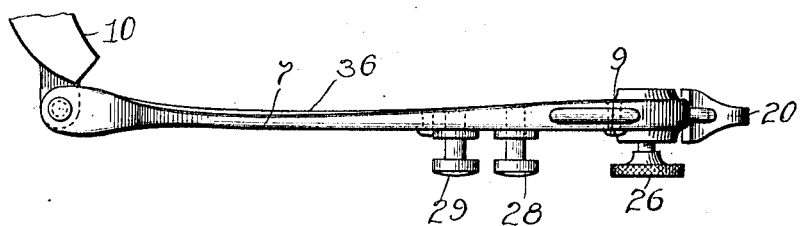

UNITED STATES PATENT OFFICE.

SOLA B. DUNN, OF CHICAGO, ILLINOIS.

MOUTH-SPECULUM.

1,022,068.  Specification of Letters Patent.  Patented Apr. 2, 1912.

Application filed August 2, 1909. Serial No. 510,691.

*To all whom it may concern:*

Be it known that I, SOLA B. DUNN, a citizen of the United States, and a resident of Chicago, in the county of Cook and State of Illinois, have invented certain new and useful Improvements in Mouth-Specula, of which the following is a full, clear, and exact specification.

This invention relates to improvements in mouth specula, especially those used by veterinarians for holding open the jaws of horses and other animals for the operation upon or treating of the interior of the mouth for the administration of medicine, and particularly for dental work upon the teeth, and which, generally stated, consists of two pair of jaws, one of which is suspended at each side of the mouth by suitable head, nose and throat straps, with the members of each pair of jaws pivoted together at their rear ends, and both the upper and lower members of each jaw being respectively connected together at their forward ends by plates adapted to impinge against the upper and lower incisors of the animal when its mouth is sustained in an open position by the operation of said jaw members.

In the mouth specula employed before my invention, the inner faces of the jaw members are straight and lie flat against the lips of the animal, holding the lips in their natural position adjacent the teeth, and in some instances tightly against the teeth, with the result that there is insufficient access to cavities in the outer faces of the teeth for cleansing them of decay, and then filling the same to the best advantages, both in time and character of work, and without paining the animal to a degree undesirable. In these prior devices the upper member of each pair of jaws is provided with an extension bar, integral with the upper member, and projecting downwardly in a plane below the lower member, said extension bar being provided with a slot in which is a fixed tooth adapted to be engaged by saw-like ratchet teeth formed in a swinging lever pivoted at its forward end to a lug projecting from the lower member, and maintained in engagement with the fixed pawl solely by its gravity, supplemented by a straight spring secured to the lower member forwardly of the pivot of the rack bar, with its free end pressing against the adjacent end of the rack bar.

Inasmuch as there is naturally a constant effort on the part of the horse to close his mouth when held open by the speculum, the result is that, in many instances, the spring is insufficient in strength, or soon becomes so from wear, to maintain the teeth of the rack bar in an engagement with the pawl necessary to prevent the horse with certainty from closing his mouth at a critical moment of the operation, and furthermore, it is found that in a short time, in the practical use of these instruments, the teeth become so rounded from wear that a spring, however strong it may be, is insufficient to maintain the rack bar with certainty at the desired adjustment for the necessary operation of the speculum to its best advantage. Furthermore and at best, the construction of the swinging rack bar, its engaging pawl, and their location, relative to the horse's mouth, is such that during an operation in the mouth they are in the way of the operator to such an extent that his arms, hands or the implements he is using inadvertently push or strike in an upward direction against the pivoted rack and disengages it, with the result that the horse closes his mouth at a critical point in the operation, and not infrequently with injury and torture to the horse. Again, in these prior structures, no means have ever been provided as a supplement to the adjustable locking devices by which the adjustable locking devices may be entirely relieved from strain due to the pressure by the mouth of a horse when the speculum is in an open operating position.

In all mouth specula, of the general character and for the purposes above described, the jaws are necessarily and exclusively moved to an open position through the main strength of the operator or his attendant, exerted by pushing forwardly on the upper jaw at but one side of the mouth, and, with the other hand pulling down the adjacent lower jaw, an operation which is not only difficult, and sometimes dangerous should the locking devices accidentally disengage, but produces an undesirable twist of the lower jaw, painful to the animal, and at the same time a twist in the jaw members resulting in a binding of their pivots, and thereby an impossibility of their proper adjustment, and sometimes a buckling or bending of the jaw members unfitting them for further use, and their adjustable locking devices inoperative.

The prime object of my invention is a mouth speculum, the locking devices for the pivoted jaws of which are so located, with reference to the animal's mouth, as to prevent any possibility of the unlocking of said jaws through inadvertence or accident on the part of the operator, or the implement he is using, and so constructed that the necessary strain, for maintaining and adjusting the rack bar in engagement with its pawl, will suffer no wear by which it is possible for the rack bar and pawl to accidentally engage against the resistance of the spring however worn out they may become after prolonged use.

A further object of my invention is to maintain the jaws of a mouth speculum in an adjustable open position by means of a swinging bar, provided with pins or other projections, engaged by a pawl so pivoted and arranged with reference to one of the jaw members as to substantially relieve said pivot from strains due to the effort of the animal to close the jaws, or, in other words, that the strain upon the pawl is entirely upon the jaw extension bar to which the pawl is pivoted.

Another object of my invention is to have the pawl so pivoted and arranged, with reference to the mouth of the horse when the speculum is in its operative position and operating, that it is substantially out of the path of the arm, the hand, and the implement held by the operator, and, therefore, at a point where there is little or no possibility of an accidental actuation disengaging it from its locking devices.

A further object of my invention is to have the pawl so pivoted and arranged with reference to its locking devices that in closing the speculum from an open position, the pawl of both pair of jaws may be easily unlocked by hand, and without any necessity whatever of a connecting strap.

Another object of my invention is to provide for such an arrangement of the pawl, with reference to the jaw members, that the gravity of its actuating handle coöperates with the spring to maintain the pawl in locked engagement with the projections of the adjusting pivoted locking bar.

A still further and important object of my invention is a hand operated lever for mechanically operating the jaws to an open position, and preferably simultaneously, and which, when the jaws are fully open, operates to entirely relieve the pawl together with its pivot, and also the rack bar from all strain due through the force exerted by the animal in efforts to close its jaws, or, in other words, a lever actuating the jaws to an open position, and so constructed that, when the speculum is opened to its limit, the entire strain, before upon the pawl, its pivot and the rack bar, is shifted to and sustained by said lever.

Another object of my invention is to have said speculum opening lever so constructed that it may be shifted upon its bearings, and operated either by a downward pull or upward lift forcing the jaws to an open position.

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claims.

In said drawings: Figure 1 illustrates my improved speculum in its operative position upon the head of a horse. Fig. 2 is an enlarged side elevation, but less than operating size, of one of the duplicate pairs of jaws, with dotted lines indicating their relative position when fully open. Fig. 3 is a top plan view of the same. Fig. 4 is an enlarged detail, partly in section, on the line 4—4 of Fig. 2; and, Fig. 5 is an enlarged elevation of the lever device for forcing the jaws of the speculum and the animal to an open operative position.

Similar characters of reference indicate the same parts in the several figures of the drawings.

Mouth specula such as herein referred to consist of two pair of jaws suspended and supported in their operative position adjacent each side of the animal's mouth by means of straps hereinafter described, and as each pair of jaws in all of their details are identically alike it is unnecessary, for the purpose of a clear understanding of my invention, to describe more than one of them in detail. With this understanding and directing attention to Fig. 2, 6 indicates a pair of speculum jaws comprising, in the position shown in Fig. 2, an upper member 7 and a lower member 8 pivoted together at their rear ends, as indicated at 9, and respectively provided at their open and free ends with plates 10 and 11 forming a bearing or rest for the upper and lower incisors of the animal, and a connection respectively between the upper and lower members of opposing pairs of jaws constituting the speculum as a whole. From one of these jaw members, and as shown in the drawings the upper member 7, there projects downwardly a bar or post 12, with its end terminating in a plane below the adjacent lower edge of the jaw member 8, and is slotted or recessed toward its lower extremity to form a bearing for a plate 13, secured by a pivot 14 to a lug 15, depending from the lower jaw member 8.

The plate 13 has, at intervals of its length, a series of pins 16 toward one side, and a series of perforations 17 toward its opposite side, the operation, and effect of which as hereinafter described, is both that of a rack bar with the laterally projecting pins forming the teeth thereof and also that of a locking bar by reasons of the perforations 17, and the pivoting of the plate, preventing its binding between the walls of the slot or recess in the post 12, as the latter is swung upon the arc of a circle when moving the jaws from and toward a closed position.

The free end of the post 12 is recessed to form parallel lugs 18 between which, by a pivot 19, is supported a pawl 20, the shank of which is extended to form a handle 21 mainly for actuating the pawl so as to disengage it from the pins 16, when closing the jaws of the speculum. The handle 21, however, operates by gravity to lift and maintain the pawl in engagement with the pins, and in this respect operates in conjunction with and is auxiliary to a coiled spring 22, one end of which seats against the handle 21, and the other against a lug 23 on the post 12, the lug projecting forwardly therefrom in the path of the spring, the resistance of which spring is overcome by an upper pressure against or lift of the handle 21 when, for any reason, it is desirable to release the engagement of the pawl with the ratchet pins.

The pawl 20 is of a novel and peculiar construction and arrangement in that it is not only provided with a tooth portion 24 but that a thickened body portion below the tooth proper so constructed, as shown at 25, that when its tooth is in engagement with any two of the pins a substantial part of and the strongest portion of the pawl together with its tooth bears directly against the rear edge of the post 12, whereby the strain otherwise upon the pivot and the point of the pawl is transferred from the pivot to the post 12, and the pivot correspondingly relieved from strains tending to bend or break it and overtighten the pawl on its pivot. This transferring of strains is of importance, owing to the constant effort of an animal to close his jaws when maintained opened by the speculum, and with the result that when, as heretofore, this strain is centered and confined to the end of the pawl and the pivot of the jaws, the pawl and pivot are frequently broken or else bent to such an extent that the speculum, as a whole, is rendered inoperative, and not infrequently, in the middle of an operation, at a time when a cessation thereof results in prolonging the misery of the animal, and sometimes, particularly in dental operations, requiring work of many minutes to be done all over again or substantially so. As for example, when the introduction of cotton saturated with a nerve destroyer is incomplete, or when a tooth has been dried ready for filling, or the filling just commenced, if the animal is permitted to close his mouth at this stage, the cotton becomes saturated with and the cavities become moistened by the liquids of his mouth, with the result that before a successful operation can be performed in either instance the cavity must be again dried out for receiving a newly saturated piece of cotton before the filling can be continued. Again, this liability of the jaws to accidentally close by the bending or breaking of the pivot of the jaws, and it might be added the tooth engaging point of the pawl, is liable to occur in the midst of pulling a tooth during its partial or incomplete removal from its socket, and whereby the animal is caused to suffer increased and prolonged torture during the interval required to repair the injury to the pivot, replace the speculum in its operative position, and again adjust the extractor to the tooth, and which may have, as frequently happens, injured sound teeth as well as the tooth to be extracted.

In specula as heretofore described the teeth of the rack bar engaged by a pawl have been formed in the bar of a saw like, that is to say a pointed knife edge construction, and the pawl of a corresponding construction, with the result that it is only a question of a short time when the knife edges of both these devices become rounded and sometimes broken off, and a certainty of their locking engagement correspondingly reduced, but, by my invention, all this is avoided by forming the rack bar teeth of pins, as above described, the engaging surfaces of which are not liable to any possible wear tending to defeat locking engagement of the pawl, while at the same time permitting the pawl to be constructed without a knife edge and of considerable lateral thickness throughout.

As a means for entirely relieving the pawl and its pivot, from any strain whatever, after the horse's mouth has been opened by the speculum to a predetermined degree, the plate 13 is provided with the perforation 17 adapted to respectively be moved to register with a thumb screw 26, working in screw threads 27 (see Fig. 4) in a perforation in the post 12, which thumb screw 26, when turned sufficiently to project into the perforations 17, positively locks the jaws in their adjusted position, and in such a position that a pressure tending to close them is substantially entirely resisted by said thumb screw 26 and the plate 13, it being understood, however, that in order to close the jaws of the speculum the thumb screw is first retracted from the plate and that thereafter the pawl handle 21 must be pushed upwardly against the resistance of the spring 22 until the pawl is disengaged from its locking pins.

As previously stated the sole means heretofore employed for moving the speculum to an open position is by taking hold of the upper jaw of the speculum with one hand and simultaneously pulling down the lower jaw with the other hand.

My invention, however, includes in a speculum, for the first time, the mechanical means through which to move the jaws of the speculum to an open position against the resistance of the mouth of the animal, and by means of a jointed lever preferably so constructed that when the speculum jaws are at the limit of their open position the jointed portion of the lever locks the jaws open against their possible accidental closing by the animal, and at the same time entirely relieves both the pawl and the rack bar from such strain. To these ends the upper and lower members 7 and 8 are respectively provided with lugs or rivets 28 and 29, adapted to be engaged by an end notch 30 and a side notch 31 in a lever, consisting of two parts 32 and 33 connected by a hinged joint 34, having the general form and arrangement of a rule joint, so that when the two parts of the lever, at a point between the notches 30 and 31, are in alinement with each other, the axis of their hinged joint will be outside of a longitudinal line centrally of their width at a point between their two notches. When the notch 30 is in engagement with the lug 28 the notch 31 engages the lug 29, and the length between these notches is such that the hinged parts are not in alinement until the jaws of the speculum are open to their fullest extent, but, it will be understood that when the jaws are closed the hinged portions of the lever will be in a partly folded condition, and that by a backward pull on the free end of the lever the hinged portion will be moved toward a straight line passing through the lugs, and in doing so force the jaws to an open position, and that, if for the purposes of contemplated operation, the jaws of the speculum are not fully open, they will nevertheless be locked against accidental closing either by the engagement of the pawl 20 with its locking pins, or by the engagement of the thumb screw 26 with the perforations 17 in the swinging rack bar, and in which position the animal is not as liable to exert as much force tending to close his jaws as he is when his jaws are extended to the fullest capacity of the speculum, and in which position the rule or toggle joint, so to speak, in the lever operates, has a perfectly rigid connection between the jaws and prevents any possibility of their being closed by the animal without the aid of the operator. In this connection it should be noted that the toggle joint is not only well toward the rear end of the jaws but that the line of pressure produced by the horse is substantially coincident with and in a straight line through the jointed lever—off one side their axis of movement, and that these two jaws are in effect held in the open position for the time being by a rigid bar with the force of the animal exerted on a line longitudinally therethrough. In any event, the lever above described, affords a convenient and successful means for mechanically forcing the jaws of the animal to a predetermined open position with the exercise of but little manual force as compared with previous methods, and with the result that the operation of moving and holding the jaws of an animal open is both facilitated and quickened.

Instead of slotting the two parts of the jaw, actuating lever perforations could be employed by means of which the lugs would secure the lever permanently to the speculum, but in practice it is preferable, for several reasons, that the lever be removable, and, therefore, that it should be provided with slots instead of perforations, one of the reasons being that by having the lever removable it may be folded compactly with the jaws when not in use and for shipping purposes; another is, for certain operators it is desirable to have the lever operated by pushing upwardly instead of pulling downwardly on its free end, and which may be accomplished by reversing the position the lever is shown to have in the drawings, and finally that when the levers are provided with a detachable connection, for their simultaneous operation, as will presently be described, there is all the more reason for having them detachable, as above set forth.

In practice the pairs of jaws constituting a complete speculum should each be provided with an actuating lever, and when used upon an animal obstinate to the opening of his mouth these levers should be connected for their simultaneous operation, and to this end each lever is provided at its free end with a perforation 35 therethrough for the reception of a rod or stiff wire of a length connecting them and forming a grasp, by means of which the operator with one hand may simultaneously operate both levers for forcing the jaws of the speculum apart and the mouth of the animal to an open position. If it is preferred, however, a headed bolt may be passed through the perforation in one lever and detachably screwed into the other.

As shown in Fig. 3 there is indicated at 36 a concavity of the inner faces of both members of the jaws of a speculum, the purpose and function of which is to prevent the jaws from holding the lips of the animal closely against the outer faces of its teeth, and to provide a space between the jaws and the lips, and thereby provide a free and unobstructed access to its teeth and gums for the purposes of treatment, and which has not before been possible owing to the fact that as the jaws of the speculum are constructed they are perfectly straight and force or at least hold the lips against the outer faces of the animal's teeth.

The tangible embodiment of my invention is not limited to the special devices and arrangement of devices shown in the drawings and hereinbefore described, for my invention includes in connection and relation a rack bar and a locking pawl therefor by which the pivot of the pawl is relieved from strain when the rack bar is in a locked position by a fixed bearing surface engaged by the pawl near to the utilization of the gravity of the pawl for promoting its maintenance in a locking position with the rack bar. Nor is my invention limited to the relative position of the pawl and rack bar with reference to the upper and lower jaws of the speculum, for obviously if the position of the jaws of the speculum is reversed so that the present lower jaw is in the position of the upper jaw, and the locking devices correspondingly shifted, for the reason that their operation would be substantially the same except possibly that the handle of the pawl will not then operate by gravity, supplementing the spring for maintaining the pawl in a locked position, and furthermore it would not be a substantial departure from my invention to omit the perforations in the swinging lever, and thumb screw for positively locking the jaws, for this positive locking like the locking character of the lever for forcing the jaws open, and as an additional precaution for use upon unusually fractious animals and particularly those having powerful jaws.

As a convenient and the usual means by which to secure the speculum in its operative position, the upper member of each pair of jaws is provided with a slot 37 for a nose strap 38 and a slot 39 for a head strap 40, adjustable by means of the usual buckle structure 41. The lower members of these jaws being likewise provided with a slot 42, having a connecting strap 43, but my invention is not limited to the particular means shown and described for maintaining the speculum in its operative position upon the animal.

Having described my invention, what I claim and desire to secure by Letters Patent is:

1. In a mouth speculum, the combination with a pivoted pin bar, a post and a thickened pawl adapted to project between the pins of said bar and bear against said post whereby the pivot of the pawl is relieved from a pressure against the pawl, substantially as described.

2. A mouth speculum comprising in combination a pivoted pin bar, a pawl adapted to project between the pins of said bar and lock the jaw members in an open position, said pawl and pins being located in a plane below both jaw members, substantially as described.

3. A mouth speculum comprising in combination a pair of jaws, a pin plate pivoted to one of said jaws, a post provided with a slot through which said pin plate is movable, a pawl pivoted toward the end of said post and adapted to engage the pins of said plate, a spring interposed between said post and pawl whereby the pawl is normally depressed to engagement with said pins, substantially as described.

4. A mouth speculum comprising in combination a pin plate pivoted to one of said jaw members, a post projecting from the other jaw member in a plane beyond the said pin plate, and a pawl pivoted to said post and adapted to be moved to engagement with said pin plate and lock the jaw members in an open position, substantially as described.

5. A mouth speculum comprising in combination a pair of pivoted jaws, a pin plate pivoted to one of said jaws, a post provided with a recess through which said pin plate is movable, a pawl pivoted to said post, a spring automatically actuating said pawl to engagement with said pin plates, and against said post, substantially as described.

6. A mouth speculum comprising in combination pivoted jaws, a pin ratchet plate, a pawl detachably engaging said plate, and means whereby said pawl is actuated by gravity to a locking engagement with said plate, substantially as described.

7. A mouth speculum comprising in combination pivoted jaws, a pin ratchet plate, a pawl detachably engaging said plate, a weighted handle for said pawl, and a spring interposed between said handle and pawl, whereby said pawl is moved to engagement with the plate simultaneously, both mechanically and by gravity, substantially as described.

8. A mouth speculum comprising in combination opposing jaw members, a ratchet plate pivoted to one of said members, a post projecting from the other member, a post provided with a recess bearing for said plate, a pawl pivoted to said post, a weighted handle for said pawl, a spring interposed between said handle and post whereby the pawl is connected to engagement with the ratchet plate by said spring and by the gravity of said handle, substantially as described.

9. A mouth speculum comprising in combination opposing jaw members, a plate pivoted to one of said members, and provided with a series of longitudinal perforations, a thumb screw working through a perforation on the other member and adapted to register with the perforations in the plate whereby said plate and its supporting jaw may be positively locked in differing adjustments thereof, substantially as described.

10. A mouth speculum comprising in combination opposing jaw members, a plate pivoted to one of said members provided with a longitudinal series of pins and perforations, a post projecting from the other member, provided with a recess bearing for said plate, a thumb screw upon said plate and adapted to register with and be projected into said perforations, said post being also provided with a recess bearing for the plate, a pawl pivoted toward the free end of said post in a plane below said thumb screw and adapted to engage said pins, a weighted lever upon said pawl, a spring interposed between said lever and post and together with the lever actuate the pawl to engagement with said pins, substantially as and for the purposes described.

11. A mouth speculum comprising in combination opposing jaw members, a detachable actuating lever therefor, means for securing said lever to both of said members, and a hinged joint in said lever intermediate its joint of connection with said members, substantially as described.

12. A mouth speculum comprising in combination opposing jaw members pivoted together, an actuating lever, means detachably securing said lever to both of said members, a pivot connection in said lever intermediate its point of attachment to said members, the axis of which pivot is at one side of a longitudinal line centrally the width of said lever whereby when the adjacent jointed parts of said lever are in a straight line with said jaws, the jaws will be locked in an open position, substantially as described.

13. A mouth speculum comprising in combination opposing jaw members each of which are provided with a lug, a jaw actuating lever provided with notches adapted to engage the stems of said lugs, heads upon said lugs locking said lever against lateral movement, a hinged joint in said lever at a point intermediate said lugs, the axis of the pivot of which is removed from the center of width of said jointed portions, whereby said jaws are opened by mechanical means against the resistance of an animal, and said mechanical means are removable from and reversible with reference to said jaw members, substantially as and for the purposes described.

In witness whereof, I have hereunto set my hand and affixed my seal, this 26th day of July A. D. 1909.

SOLA B. DUNN. [L. S.]

Witnesses:
JOHN G. ELLIOTT,
H. E. BROM.

---

Copies of this patent may be obtained for five cents each, by addressing the "Commissioner of Patents, Washington, D. C."